United States Patent [19]

Ponce

[11] Patent Number: 4,553,336
[45] Date of Patent: Nov. 19, 1985

[54] LATCH FACE TEMPLATE FOR A PORTABLE ROUTER

[76] Inventor: Felix C. Ponce, 978 S. Westmoreland Ave., Los Angeles, Calif. 90006

[21] Appl. No.: 494,855

[22] Filed: May 16, 1983

[51] Int. Cl.$^4$ ............................................. B27F 5/12
[52] U.S. Cl. ............................................. 33/197; 33/562; 144/144.5 R; 144/27
[58] Field of Search ................ 33/197, 174 G, 562; 144/144.5, 27

[56] References Cited

U.S. PATENT DOCUMENTS

| | | | |
|---|---|---|---|
| 2,585,470 | 2/1952 | Josephson | 33/197 |
| 2,629,937 | 3/1953 | Tubbs | 144/27 X |
| 3,344,827 | 10/1967 | Kvalheim et al. | 144/27 X |
| 3,519,043 | 7/1970 | Guill | 144/144.5 |
| 3,559,704 | 2/1971 | Thompson | 33/197 |

*Primary Examiner*—William D. Martin, Jr.
*Attorney, Agent, or Firm*—W. Edward Johansen

[57] ABSTRACT

The present invention is a latch face template which is used to guide a hand-held router in order to cut an opening for a latch face in the side of a door. The latch face template includes a rectangular base which has a top surface and a bottom surface and which also has a rectangular slot. A width varying mechanism varies the width of the rectangular slot and is mechanically coupled to the rectangular base. A guide stop controls the length of the opening for the latch face. A position varying mechanism varies the position of the latch face template on the side of the door. A securing mechanism secures the rectangular base to the door. The width varying mechanism includes a rectangular groove on the top surface of the rectangular base which is disposed adjacent to the rectangular slot, a first flat, rectangular bar which is disposed within the rectangular groove and adjustably coupled to the top surface of the rectangular base and a first adjusting mechanism which adjusts the position of the first flat, rectangular bar in order to adjust the width of the opening for the latch face in the side of the door. The position varying mechanism includes a second flat, rectangular bar and a second adjusting mechanism which adjusts the lateral position of the second flat, rectangular bar in order to adjust the position of the latch face template on the side of the door.

4 Claims, 4 Drawing Figures

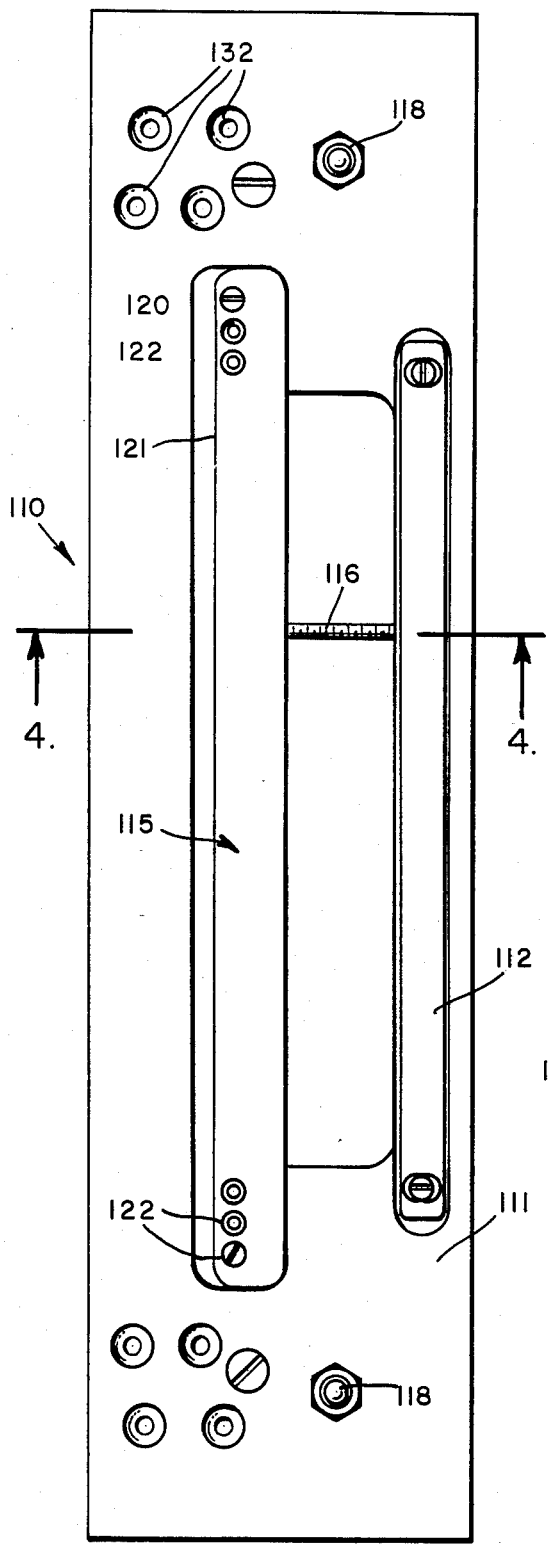
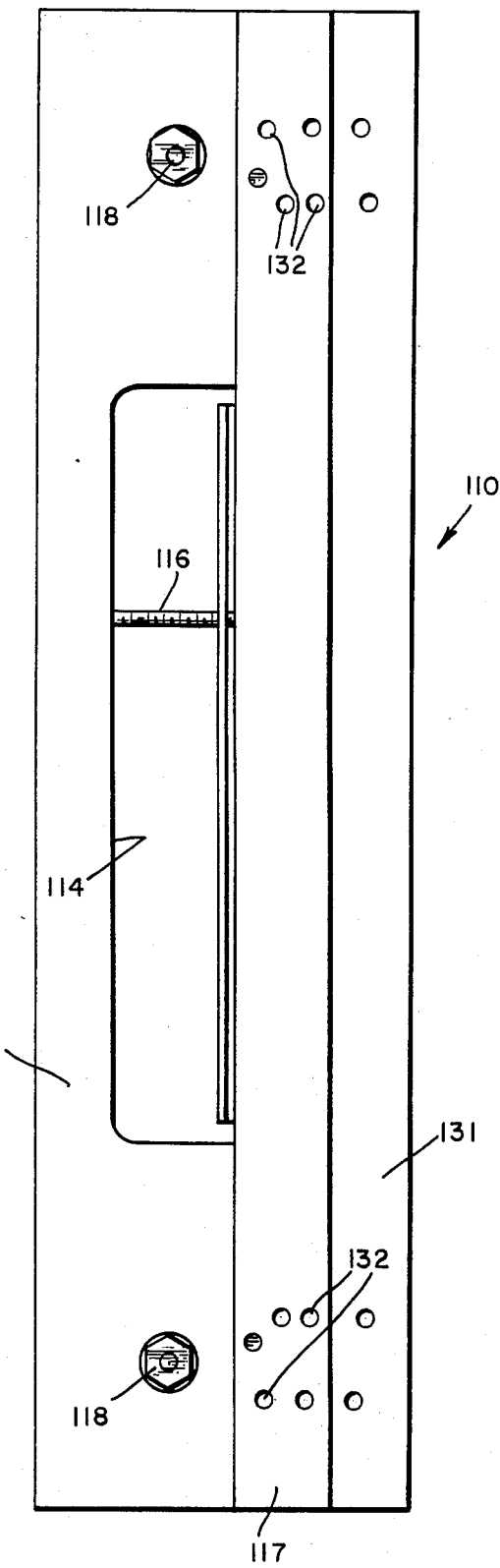

4,553,336

LATCH FACE TEMPLATE FOR A PORTABLE ROUTER

BACKGROUND OF THE INVENTION

1. Field of the Invention

The present invention relates to a woodworking fixture which is both a work holder and template for use with a portable router and more particularly to a workworking fixture which holds either a portion of a door or a portion of the door jamb and provides a template for use with a portable router for cutting either a opening for a latch face on the door or an opening for a strike in the door jamb.

2. Description of the Prior Art

Various types of device designed for use with a cutting tool to cut cabinet joints or to shape various pieces of wood have been known. Some of these various fixtures have included clamping devices for holding pieces of wood. Several of the fixtures have included some form of a template for a router to follow in order to provide a surface design or to form certain cuts for an appropriate joint.

U.S. Pat. No. 3,841,368, entitled Routing Device, issued to Nicholas H. Ritter on Oct. 15, 1974, teaches a routing device which has parallel guides on a guide base to position a work piece therebetween, a tool platform to position and support the tool, a tool support plate and a frame to provide angular orientational movement of the tool, and selective indexing mechanisms which are disposed between the parallel guides and the frame, the frame and the blade, and the tool platform and the tool support plate.

U.S. Pat. No. 4,356,849, entitled Molding Curvature Template Fixture, issued to Donald L. Fredrickson on Nov. 2, 1982, teaches a molding curvature template fixture which holds a strip of molding and provides a template for a portable router to follow to shape an end of the strip of molding substantially similar to the cross-sectional shape of the shaped side of the molding. The molding can then fit over the shaped side of an adjacent, perpendicularly disposed strip to form a right angle joint. The fixture includes a box-section frame which has a series of lateral slots and a clamping mechanism. Each slot includes a guiding surface which has a shape substantially similar to the cross-sectional shape of the shaped side of a strip of molding. An insert may be attached to the box section frame to provide a guiding surface for cutting molding which has a non-standard shape.

U.S. Pat. No. 4,323,100, entitled Router Guide, issued to Howard Silken on Apr. 6, 1982, teaches a router guide which has a guide plate for attachment to the base of a router with a central opening for passing the router bit. On the bottom, the guide plate has a series of openings spaced apart along a spiral of progressively increasing radius which has the central opening as its center. A pivot pin is selectively insertable into any one of these openings. The pivot pin has a pointed end for insertion in a workpiece at the center of a circular groove which is to be cut in the workpiece by the router bit as the guide plate is rotated about the pivot pin.

U.S. Pat. No. 4,319,615, entitled Router Attachment for Ornamenting a Workpiece, issued to Henry A. Ditmanson on Mar. 16, 1982, teaches a set of undulatory rails on a track which can be oriented in any given direction by placing the track on a turntable. A wheeled carriage rides to or fro on the track and carries a router. The router bit rises and falls in response to the particular profile of the rails and cuts recesses in an underlying workpiece which has shapes dependent on rail contour, bit size and shape and extent of carriage travel. Turntable indexing capabilities facilitate the reproducibility of complex decorative patterns which are sculptured in the workpiece.

U.S. Pat. No. 4,299,263, entitled Mechanical Router Guide, issued to Charles D. Skinner on Nov. 10, 1981, teaches a fixture which positions and guides a router above the surface of a stationary piece, whereby the router is subject to a composite, three directional movement as it is moved above the workpiece. The indexing table carries a template holding frame which can be slanted at an adjustable angle in relation to the workpiece in order to create designs of varying depth and width into the workpiece.

SUMMARY OF THE INVENTION

In view of the foregoing factors and conditions which are characteristic of the prior art it is the primary object of the present invention to provide a woodworking fixture which holds a portion of a door and provides a template for use with a portable router for cutting an opening for a latch face on the door.

In accordance with the present invention an embodiment of a latch face template for use in combination with a hand-held router in order to guide the hand-held router in cutting an opening for a latch face in the side of a door. The latch face template includes a rectangular base having a top surface and a bottom surface and also having a rectangular slot, a width varying mechanism which varies the width of the rectangular slot and which is mechanically coupled to the rectangular base. The latch face template also includes a guide stop which controls the length of the opening for the latch face, a position varying mechanism which varies the position of the latch face template on the side of the door which is mechanically coupled to the rectangular base and a securing mechanism which secures the rectangular base to the door. The width varying mechanism includes a rectangular groove on the top surface of the rectangular base which is disposed adjacent to the rectangular slot, a first flat, rectangular bar which is disposed within the rectangular groove and adjustably coupled to the top surface of the rectangular base and a first adjusting mechanism which adjusts the position of the first flat, rectangular bar in order to adjust the width of the opening for the latch face in the side of the door. The position varying mechanism includes a second flat, rectangular bar and a second adjusting mechanism which adjusts the lateral position of the second flat, rectangular bar in order to adjust the position of the latch face template on the side of the door.

The features of the present invention which are believed to be novel are set forth with particularity in the appended claims.

Other claims and many of the attendant advantages will be more readily appreciated as the same becomes better understood by reference to the following detailed description and considered in connection with the accompanying drawing in which like reference symbols designate like parts throughout the figures.

DESCRIPTION OF THE DRAWING

FIG. 1 is a top plan view of a latch face template for use with a portable router for cutting an opening for a FIG. 2 is a bottom plan view of the latch face template of FIG. 1.

DESCRIPTION OF THE PREFERRED EMBODIMENT

Figure 3:
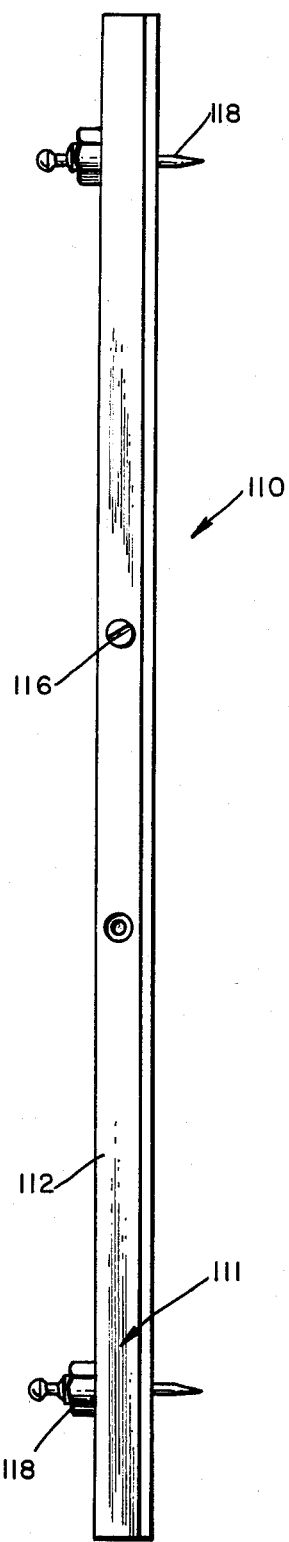
FIG. 3 is a side elevation view of the latch face template of FIG. 1.

In order to best understand the present invention it is necessary to refer to the following description of its preferred embodiment in conjunction with the accompanying drawing. Referring to FIG. 1 in conjunction with FIG. 2 a latch face template 110 for use in combination with a hand-held router in order to guide the hand-held router in cutting an opening for a latch face in the side of a door. The latch face template 110 includes a rectangular base 111 having a top surface 112 and a bottom surface 113 and also having a rectangular slot 114, a width varying mechanism 115 which varies the width of the rectangular slot 114 and which is mechanically coupled to the rectangular base 111.

Figure 4:
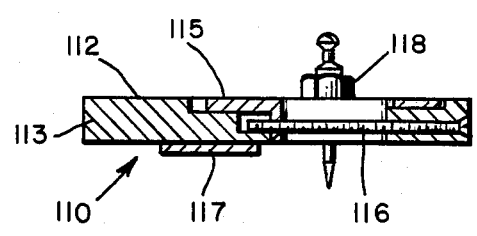
FIG. 4 is a cross-sectional view of the latch face template of FIG. 1 taken along the line 4—4 of FIG. 1.

Referring to FIG. 1 in conjunction with FIG. 2, FIG. 3 and FIG. 4 the latch face template 110 also includes a guide stop 116 which controls the length of the opening for the latch face, a position varying mechanism 117 which varies the position of the latch face template 110 on the side of the door which is mechanically coupled to the rectangular base 111 and a securing mechanism 118 which secures the rectangular base 111 to the door.

Referring again to FIG. 1 the width varying mechanism 115 includes a rectangular groove 120 on the top surface 112 of the rectangular base 11 which is disposed adjacent to the rectangular slot 114, a first flat, rectangular bar 121 which is disposed within the rectangular groove 120 and adjustably coupled to the top surface of the rectangular base and a first adjusting mechanism 122 which adjusts the position of the first flat, rectangular bar 121 in order to adjust the width of the opening for the latch face in the side of the door.

Referring again to FIG. 2 the position varying mechanism 117 includes a second flat, rectangular bar 131 and a second adjusting mechanism 132 which adjusts the lateral position of the second flat, rectangular bar 131 in order to adjust the position of the latch face template 110 on the side of the door.

From the foregoing it can be seen that a woodworking fixtures for holding a latch face workpiece and providing a template for a portable router for has been described. It should be noted that the sketches are not drawn to scale and that distance of and between the figures are not to be considered significant.

Accordingly it is intended that the foregoing disclosure and showing made in the drawing shall be considered only as an illustration of the principles of the present invention.

What is claimed is:

1. A latch face template for use in combination with a hand-held router in order to guide the hand-held router in cutting an opening for a latch face in the side of a door, said latch face template comprising:
   a. a rectangular base having a top surface and a bottom surface and also having a rectangular slot;
   b. width varying means for varying the width of said rectangular slot, mechanically coupled to said rectangular base;
   c. a guide stopping means for controlling the length of the opening for the latch face, said guide stopping means being mechanically coupled to said rectangular base; and
   d. position varying means for varying the position of said latch face template on the side of the door, mechanically coupled to said rectangular base.

2. A latch face template according to claim 1 wherein said latch face template also comprises securing means for securing said rectangular base to the door.

3. A latch face template according to claim 2 wherein said width varying means comprises:
   a. a rectangular groove on said top surface of said rectangular base disposed adjacent said rectangular slot;
   b. a first flat, rectangular bar which is disposed within said rectangular groove and adjustably coupled to said top surface of said rectangular base; and
   c. adjusting means for adjusting the position of said first flat, rectangular bar in order to adjust the width of the latch face in the side of the door.

4. A latch face template according to claim 3 wherein said position varying means comprises:
   a. a second flat, rectangular bar; and
   b. adjusting means for adjusting the lateral position of said second flat, rectangular bar in order to adjust the position of the latch face template on the side of the door.

* * * * *